United States Patent [19]

Harris et al.

[11] Patent Number: 4,677,991
[45] Date of Patent: Jul. 7, 1987

[54] GRAIN DEFLECTOR FOR COMBINES

[76] Inventors: James R. Harris; Leland H. Harris, both of R.R. 1, Miami, Mo. 65344

[21] Appl. No.: 824,435

[22] Filed: Jan. 31, 1986

[51] Int. Cl.$^4$ ............................................. A01F 12/44
[52] U.S. Cl. ................................................. 130/27 AE
[58] Field of Search .............. 130/27 AE, 24; 56/209; 209/264; 406/181

[56] References Cited

U.S. PATENT DOCUMENTS

| | | | |
|---|---|---|---|
| 2,189,706 | 10/1938 | Clipston | 130/24 |
| 2,310,610 | 2/1943 | Bissell | 209/254 |
| 2,691,444 | 10/1954 | Oliver | 130/27 AE |
| 2,732,941 | 1/1956 | Deiss | 209/261 |
| 2,739,597 | 3/1956 | Buttars | 130/24 |
| 2,750,037 | 5/1956 | Taylor | 209/261 |
| 2,950,720 | 8/1960 | Sheard | 130/27 AE X |
| 3,456,652 | 7/1969 | Louks et al. | 130/27 |
| 3,513,973 | 5/1970 | Grulke | 209/264 X |
| 3,608,558 | 9/1971 | Sletmann | 130/27 |
| 3,999,806 | 12/1976 | Hurd | 406/181 |
| 4,535,788 | 8/1985 | Rowland-Hill et al. | 130/27 AE |

FOREIGN PATENT DOCUMENTS

| | | | |
|---|---|---|---|
| 216829 | 9/1958 | Australia | 130/27 AE |
| 2632560 | 1/1978 | Fed. Rep. of Germany | |

Primary Examiner—Stephen J. Novosad
Assistant Examiner—Matthew Smith
Attorney, Agent, or Firm—Schmidt, Johnson, Hovey & Williams

[57] ABSTRACT

A pair of elongated, generally transversely triangular deflector members are attachable to opposite, upstanding sidewalls of the foraminous, platform-like cleaning shoe of a combine for the purpose of preventing disproportionate accumulation and build-up of crop materials on the downhill side of the cleaning shoe when the combine is performing harvesting operations on sidehill slopes. The deflector members are fixed to such sidewalls for reciprocation with the shoe during agitation thereof and are provided with upwardly and inwardly extending baffle surfaces having the ability to redirect crop materials and air currents back toward the central portion of the shoe to counteract the effective gravity tending to cause the disproportionate accumulation of materials against the downhill sidewall. Through the inclined baffle surfaces and oppositely inclined feeder plates on downwardly and inwardly inclined surfaces of the members, the materials tend to be spread more evenly over the entire surface area of the shoe than would otherwise be the case in sidehill slope situations, to the end that grain loss is reduced and cleaning efficiency is increased.

39 Claims, 6 Drawing Figures

GRAIN DEFLECTOR FOR COMBINES

TECHNICAL FIELD

This invention relates to the field of crop harvesting and, more particularly, to improvements in the internal grain cleaning mechanism found within large harvesting machines commonly referred to as "combines".

BACKGROUND

Present-day corn and soy bean combines are typically provided with one or more foraminous cleaning platforms or "shoes" which, when reciprocated or shaken rapidly while a strong current of air is passed upwardly through the shoe and along its upper surface, is capable of fairly effectively separating heavier grain particles from lighter chaff and trash materials. The heavier materials resist entrainment in the airstream and gravitate through apertures in the cleaning shoe for collation and temporary storage in a collection chamber on the combine, while the lighter chaff particles become airborne and are carried from the top surface of the cleaning shoe toward the rear of the combine for discharge.

Combining on sidehill slopes presents a number of problems, among which is the natural tendency for crop materials deposited on the cleaning shoe to gravitate toward the downhill side of the combine and thus accumulate disproportionately along the downhill sidewall of the cleaning shoe, instead of spreading fairly evenly over the entire surface area of the cleaning shoe as in normal, flat land combining. As a result of such excessive, localized accumulation of materials, airflow upwardly through the shoe and along the top surface thereof is impeded, to the end that desirable grain particles may be shaken off the end of the shoe and discharged along with trash and chaff particles instead of passing down through the shoe in the intended manner. Depending of course upon the extent of the farmer's acreage devoted to sidehill slopes or terraces, the grain losses incurred can be quite significant and costly, particularly considering the farmer's need to be as efficient and productive as possible in order to realize a net return on the relatively high capital costs involved in modern farming operations.

As is well known by those skilled in the art, some combines are conventionally provided with hydraulic levelling mechanisms that permit the harvesting header of the machine to remain tilted according to the sidehill slope while the operator cab, grain cleaning apparatus and storage tank are adjustably rotated about a fore and aft axis relative to the header to such an extent that those portions of the machine remain fairly level. Thus, among other things, the materials which collect on the cleaning shoes for separation and cleaning are spread out relatively evenly and the cleaning action can be carried out relatively efficiently. However, such selectively tiltable, hydraulic levelling systems are quite expensive and are thus financially beyond the reach of many who would perhaps seriously be in need of such features.

Additionally, certain conventionally existing combines are provided with so called "lift-out chaffer sections" located on each side of the chaffer at the back of the combine which, when removed, cause crop that builds up on the downhill side of the cleaning shoe to be captured and routed back to the initial cleaning cylinder. However, not all combines are provided with such lift-out sections and, moreover, such construction does not entirely solve the grain loss problems when harvesting sidehill slopes.

SUMMARY OF THE PRESENT INVENTION

Accordingly, one important object of the present invention is to provide special deflectors of relatively uncomplicated design which may either be retrofitted or factory installed on the sides of the cleaning shoes of otherwise conventional harvesting combines for the purpose of redirecting materials which might tend to disproportionately accumulate against the downhill side of the cleaning shoe back toward the central portion of such shoe to thereby maintain an effective and efficient cleaning and separating action by the reciprocating shoe and its attendant current of air.

Pursuant to the foregoing, the present invention contemplates a pair of elongated, generally transversely triangular-appearing deflector members secured to opposite, generally upstanding sidewalls of the cleaning shoe such that the longitudinal axis of each member extends in a fore and aft direction generally parallel to the path of reciprocation of the shoe. Opposite sloping surfaces of each member converge from what may be defined as a base of the member toward a common apex extending the length of the member in the direction of reciprocation. The uppwardly and inwardly sloping surfaces of the member overhang lateral marginal portions of the shoe and thus serve as baffles to direct the air current and accumulated crop materials back toward the central portion of the shoe as the latter reciprocates during the separation and cleaning operation. The other downwardly and inwardly extending surfaces of the members carry respective series of inclined and fore and aft obliquely angled feeder plates, standing on edge, which gently encourage the crop materials to move toward the discharge point while at the same time directing the same back toward the central portion of the cleaning shoe for most effective separating and cleaning action. Opposite closed ends on each member provide the overall transversely triangular appearance to the members which are most effectively formed from sheet metal so as to present crosssectionally generally L-shaped configurations inboard of such opposite, closed ends.

DETAILED DESCRIPTION OF THE DRAWING

Figure 1:
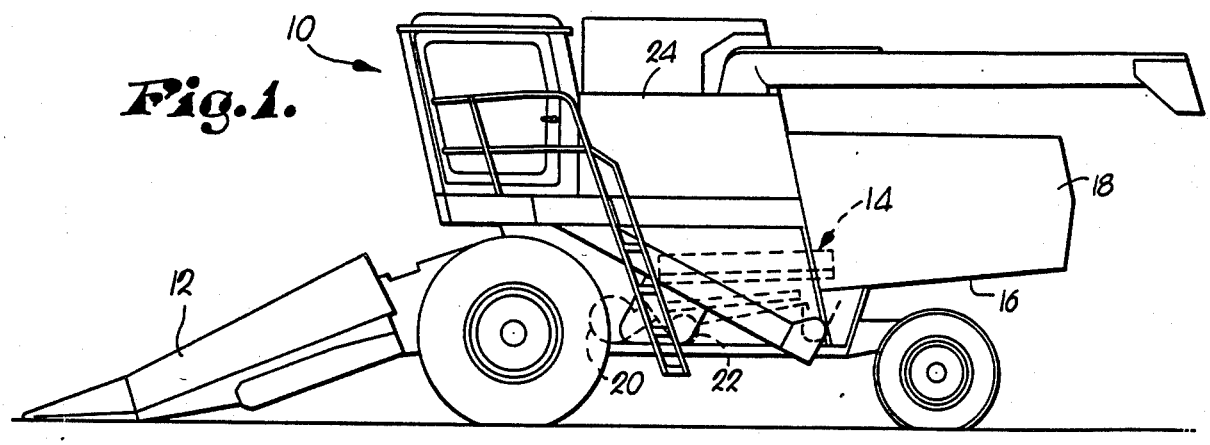
FIG. 1 is a schematic, side elevational view of a conventional combine harvester illustrating certain of the internal cleaning mechanism thereof in phantom lines.

FIG. 1 shows a typical harvesting machine or combine 10 provided with the usual crop harvesting header 12 and internal grain cleaning mechanism including a fore and aft reciprocable, foraminous platform or cleaning shoe 14 which receives harvested crop materials and performs a final cleaning or separating function on such materials to preserve and retain the fruit or grain itself while advancing the trash or chaff particles toward a point of discharge 16 beneath the open bottom, rear hood 18 of the combine. A high velocity fan 20 of suitable design and well understood by those skilled in the art is associated with the cleaning shoe 14 for directing a powerful current of air upwardly through the same and along the top surface thereof to assist in the cleaning action and conveyance of trash and chaff materials toward the discharge 16. Cleaned grain gravitating through the shoe 14 is collected below the ladder in a cross auger-trough assembly 22 which serves to collect the grain and ultimately transfer it to the temporary storage tank 24 of the combine 10.

Figure 2:
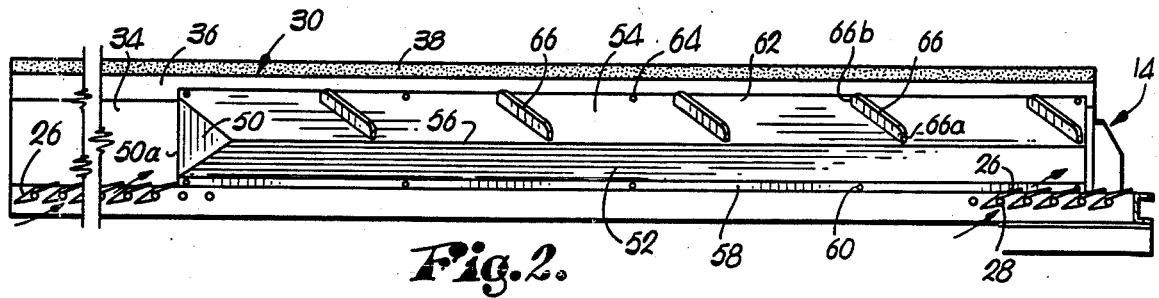
FIG. 2 is an enlarged, fragmentary vertical cross-sectional view through a cleaning shoe of the combine showing in elevation one deflector of the present invention attached to a corresponding sidewall of the cleaning shoe.
Figure 3:
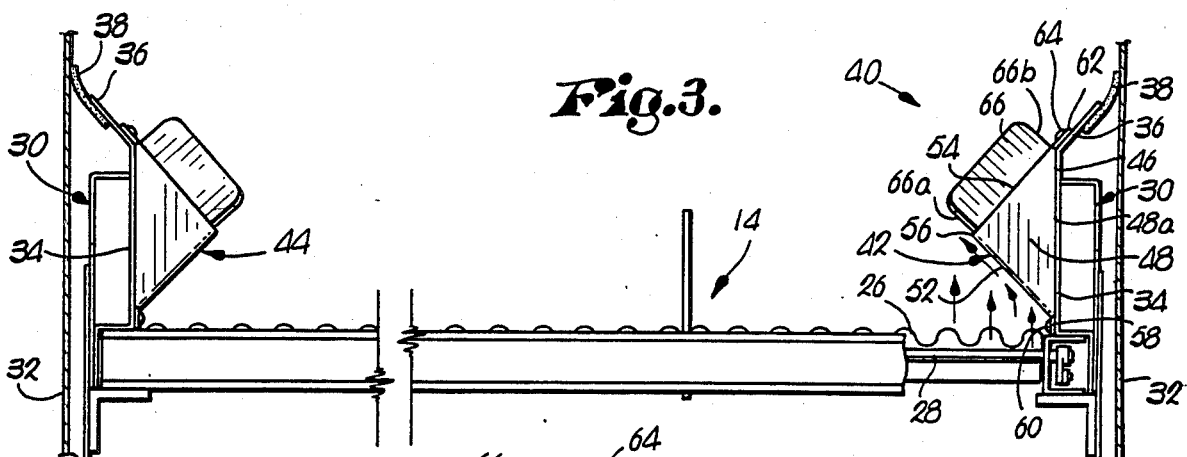
FIG. 3 is a fragmentary, transverse vertical cross-sectional view through the internal cleaning mechanism of the combine taken at right angles to the view in FIG. 2 and from the rear of the combine to illustrate the manner in which the deflector members of the present invention are secured to opposite sidewalls of the cleaning shoe, certain portions of the shoe being broken away to reveal details of construction and the redirecting action of one of the deflector members.

Referring more particularly to FIGS. 2 and 3, it will be noted that the cleaning shoe 14 includes a generally platform-like, foraminous surface defined by a multitude of riddle fingers 26 arranged in rank-like formations extending across the width of the shoe 14. Each row or rank of the fingers 26 is affixed to a common transverse shaft 28 which may be adjustably rotated about its longitudinal axis by means not shown for the purpose of selectively varying the size, character and configuration of the open spaces or apertures between the fingers 26, thus concurrently adjusting the cleaning action of the air current and reciprocating shoe 14 on materials deposited on the fingers 26.

The reciprocable shoe 14 also includes a pair of opposite, upstanding sidewalls 30 extending along the length of the platform portion of the shoe 14 just inboard of opposite housing sides 32 of the combine 10. The sidewalls 30 are mechanically interconnected with the platform portion of the shoe 14 defined by the riddle fingers 26 such that the sidewalls 30 reciprocate with the fingers 26 during cleaning operations, all relative to the housing sides 32. Each sidewall 30 includes, among other things, an upstanding panel 34, an outturned section 36 extending upwardly and outwardly from the panel 34 at approximately a 45° angle from the latter, and a resilient, terminal, sealing flap strip 38 projecting upwardly and outwardly beyond the outturned section 36 as an extension thereof. Sealing strip 38 makes wiping engagement with the proximal housing side 32 during reciprocation of the shoe 14 and prevents excessive escape of air upwardly through the interface between the shoe 14 and the housing sides 32 which must, of course, be present in order to permit free reciprocation of the shoe 14 relative to the housing sides 32.

In accordance with the principles of the present invention, the shoe 14 is provided with an attachment broadly denoted by the numeral 40 which includes a pair of separate deflector members 42 and 44 for opposite ones of the sidewalls 30. The members 42 and 44 are identical in construction and operation to one another except, as will be explained below, the deflector member 42 is adapted for mounting upon the "right-hand" sidewall 30 as viewed from the rear of the machine, while the deflector member 44 is adapted for mounting on the "left-hand" sidewall 30 as likewise viewed from the rear of the machine.

Each member 42, 44 is basically transversely triangular-shaped when viewed in overall, external configuration such as when attached to the sidewalls 30. In this respect, each member 42, 44 is configured to present a base 46 defined in part by edge extremities 48a and 50a of opposite triangular end walls 48 and 50 of each member 42, 44. Such edge extremities 48a and 50a flatly and abuttingly engage the panel 34 of the corresponding sidewall 34 when the members 42, 44 are secured to the shoe 14.

Figure 4:
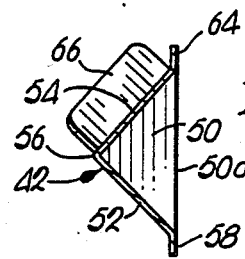
FIG. 4 is a transverse, cross-sectional view of a slightly alternative form of deflector member from that illustrated in FIGS. 2 and 3.

Each member 42, 44 is actually most conveniently formed from sheet metal material as illustrated by the slightly alternative form of the member 42 illustrated in FIG. 4. In the crosssectional view revealed by FIG. 4, it will be seen that the member 42 is generally transversely crosssectionally L-shaped inboard of its two opposite end walls 48 and 50, presently a pair of opposite legs 52 and 54 projecting angularly outwardly from the base 46 and meeting at a common, longitudinally extending apex 56. The leg 52 has an inturned flange 58 extending along the length thereof adjacent the base 46 which normally flatly abuttingly engages the panel 34 of the corresponding sidewall 30 and serves as a portion of the means for securing the member 42, 44 to such sidewall 30. Additional components of the means for securing the member 42, 44 to the corresponding sidewall 30 include pop rivets 60 or the like passing through the flange 58 and into the lower extremity of the sidewall panel 34, an upper lip 62 on the leg 54 along the length of the ladder and projecting beyond the base 46 as an extension of leg 54 for mating, abutting engagement with the outturned section 36 of sidewall 30, and pop rivets 64 or the like in the lip 62 and passing through the outturned section 36. As shown in the slightly altered embodiment of FIG. 4, the lip 64 may be outturned in the same way as the lower flange 58 instead of extending as an extension of the leg 54, depending upon the specific configuration of the sidewall to which the member is to be attached.

It will be noted that as a result of the formed construction of each member 42, 44, such member has a basically hollow interior which would be open at the opposite ends thereof but for the presence of the end walls 48 and 50 which serve to close the same and prevent the entry of crop material during use. End wall 48 completely spans the legs 52, 54 and may advantageously be welded thereto in perpendicular relationship to such legs. On the other hand, the front end wall 50, while likewise spanning the legs 52, 54, is inclined obliquely with respect to such legs in such a manner that the end wall 50 leans back toward the opposite end wall 48 as the apex 56 is approached.

As will become clear in the description of the operation which follows, the leg 52 of each member 42, 44 serves as an inclined baffle surface which overhangs a corresponding lateral margin of the platform portion of the shoe 14. On the other hand, the opposite leg 54 of each member 42, 44 presents a supporting and mounting surface for a plurality of upstanding, transverse feeder plates 66 arranged in a series along the leg 54. The feeder plates 66 are spaced apart along the leg 54, generally span the full width of the leg 54 from the base 46 to the apex 56, and are disposed in parallel relationship to one another, with each being obliquely angled relative to the longitudinal axis of the members 42, 44. The angular relationship of the feeder plates 66 to the members 42, 44 is such that each feeder plate 66 presents a lowermost extremity 66a which is closest to the discharge 16 and an uppermost extremity 66b which is farthest from the point of discharge 16. Stated differently, each of the feeder plates 66 is so angled that its lower extremity 66a is disposed rearward of its upper extremity 66b.

It is in the angulation of the feeder plates 66 that the two members 42 and 44 differ slightly. In this respect, in order for the feeder plates 66 on both of the members 42, 44 to slope downwardly and rearwardly, it is necessary that the two members 42, 44 and their respective feeder plates be mirror images of one another rather than exact duplicates of one another.

Figure 6:
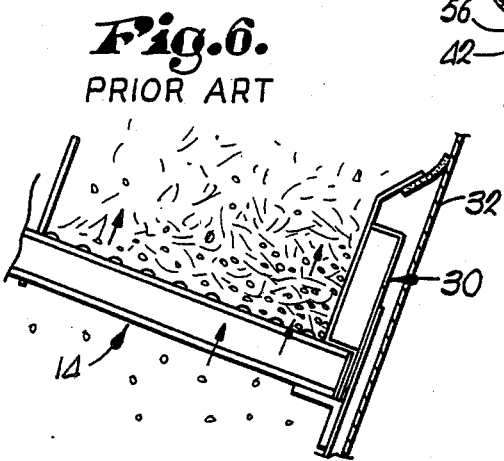
FIG. 6 is a fragmentary schematic view similar to FIG. 5 but of the prior art arrangement wherein a disproportionate amount of crop materials tended to accumulate against a downhill side of the cleaning shoe when the combine was used to harvest sidehill slopes.
Figure 5:
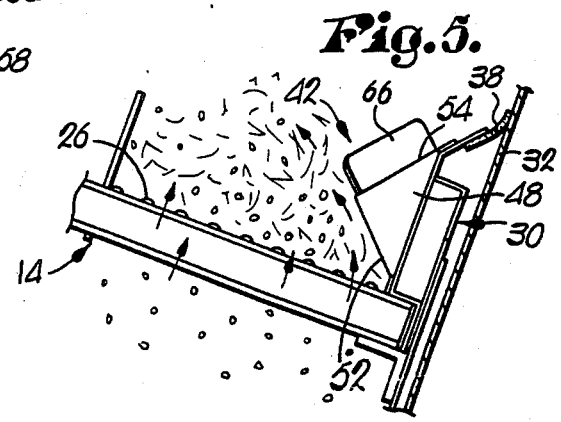
FIG. 5 is a fragmentary schematic view illustrating the manner in which a deflector constructed in accordance with the principles of the present invention functions to redirect crop materials back toward the center of the cleaning shoe when sidehill slopes are encountered.

Use of the members 42, 44 as an attachment to the cleaning shoe 14 is perhaps best illustrated in FIGS. 5 and 6. In this respect, it will be seen in FIG. 6 that without the right-hand member 42 when a sidehill slope is such as to cause the crop materials on shoe 14 to naturally gravitate toward right-hand sidewall 30, such materials tend to disproportionately accumulate against the right-hand sidewall 30 and thereby block effective airflow upwardly through the riddle fingers 26. Consequently, continued reciprocation of the shoe 14 and that airflow which does move rearwardly across the top surface of the shoe 14 tends to cause the valuable grain itself, as well as the less valuable trash and chaff materials, to simply be discharged out the rear end of the combine through the discharge 16.

On the other hand, with the right-hand deflector member 42 installed (selected for illustrative purposes only; the same action being true during a sidehill slope placing the left-hand member 44 on the downhill side), the baffle surface presented by the upwardly and inwardly inclined leg 52 of member 42 causes the crop materials and air flow to be directed back toward the central portion of the shoe 44 so as to more evenly spread out such materials over the entire top surface of the platform portion of shoe 14. Consequently, the chaff and trash materials become lifted and entrained in the proper manner, leaving the valuable grain itself free to dislodge itself from the accumulated trash material and fall down through the apertures through the riddle fingers 26 in the intended manner. It will be seen also that the feeder plates 66 are useful in promoting return of the materials toward the center of the shoe 14 in a gentle yet positive manner as they engage such material during reciprocating movement.

In practice it has been found that the deflector attachment of the present invention has significantly reduced the amount of grain loss associated with sidehill harvesting operations. Moreover, it has permitted the ground speed of the combine to be increased significantly during sidehill operations which, of course, has a positive net effect on harvesting productivity and efficiency. Furthermore, it has been found that the attachment of the present invention is useful in overcoming trash build-up otherwise associated with such operations to minimize downtime and promote smooth, effective and efficient grain cleaning action.

We claim:

1. In a crop harvesting machine having apparatus for separating chaff and grain from harvested crop materials, the improvement comprising:

a foraminous, crop material receiving and separating platform through which heavier grain particles may gravitate while lighter chaff particles may remain behind, said platform presenting an upper surface, pair of side margins and a central region therebetween, means for directing a stream of air upwardly through the platform and across a top surface thereof for entraining separated chaff particles and carrying the same away from the platform to a point of discharge, said platform being reciprocable within its plane generally toward and away from said discharge point to facilitate separation of the chaff and grain particles; and structure for preventing a disproportionate, gravitational accumulation of crop materials adjacent a downhill one of said side margins when the harvesting machine is tilted during slope harvesting, whereby to reduce the amount of grain particles otherwise unintentionally discharged with the chaff particles at said point of discharge due to ineffective separation caused by such disproportionate accumulation of crop materials, said structure comprising means defining an elongated baffle surface adjacent each of said side margins and extending along a substantial portion of the length thereof, each of said baffle surfaces extending upwardly and inwardly from the adjacent side margin and towards said central region, and means supporting said baffle surfaces in a fixed orientation relative to said platform upper surface.

2. In a crop harvesting machine as claimed in claim 1, there being a pair of upstanding marginal sidewalls operatively connected with said platform for reciprocation therewith, each of said baffle surfaces extending along an adjacent sidewall for reciprocation therewith.

3. In a crop harvesting machine as claimed in claim 2, wherein said structure further includes a plurality of transverse feeder plates extending in a series along each of said sidewalls for reciprocation therewith, each of said feeder plates being disposed generally above the corresponding baffle surface and projecting inwardly from the respective sidewall.

4. In a crop harvesting machine as claimed in claim 3, wherein each of said feeder plates slopes downwardly and inwardly toward the opposite sidewall.

5. In a crop harvesting machine as claimed in claim 4, wherein each of said feeder plates is inclined obliquely with respect to the path of reciprocation of the platform to present a lower extremity nearest said point of discharge and an upper extremity farthest from said point of discharge.

6. In a crop harvesting machine as claimed in claim 5, wherein the feeder plates along each sidewall are parallel to one another.

7. In a crop harvesting machine as claimed in claim 1, wherein said structure includes a plurality of transverse feeder plates extending in a series along each of said sidewalls for reciprocation therewith, said plates projecting inwardly from their corresponding sidewalls toward the opposite sidewall and being disposed above said top surface of the platform.

8. In a crop harvesting machine as claimed in claim 7, wherein each of said feeder plates slopes downwardly and inwardly toward the opposite sidewall.

9. In a crop harvesting machine as claimed in claim 8, wherein each of said feeder plates is inclined obliquely with respect to the path of reciprocation of the platform to present a lower extremity nearest said point of discharge and an upper extremity farthest from said point of discharge.

10. In a crop harvesting machine as claimed in claim 9, wherein the feeder plates along each sidewall are parallel to one another.

11. In a crop harvesting machine as claimed in claim 2, wherein said structure includes an elongated, generally transversely L-shaped member for each sidewall having a pair of legs converging to an apex extending parallel to the longitudinal axis of the member, each member being disposed on the inboard side of the corresponding sidewall with said legs thereof projecting inwardly toward the opposite sidewall and said apex extending parallel to the direction of reciprocation of the platform, one of said legs projecting upwardly and inwardly from the sidewall to present said inclined, inwardly projecting baffle surface above said top surface of the platform and the other of said legs projecting downwardly and inwardly from the sidewall to rigidify said baffle surface.

12. In a crop harvesting machine as claimed in claim 11, wherein said other leg is provided with a plurality of transverse feeder plates thereon extending in a series along the same for reciprocation therewith.

13. In a crop harvesting machine as claimed in claim 12, wherein each of said feeder plates slopes downwardly and inwardly toward the opposite sidewall.

14. In a crop harvesting machine as claimed in claim 13, wherein each of said feeder plates is inclined obliquely with respect to the path of reciprocation of the platform to present a lower extremity nearest said point of discharge and an upper extremity farthest from said point of discharge.

15. In a crop harvesting machine as claimed in claim 14, wherein the feeder plates along each sidewall are parallel to one another.

16. In a crop harvesting machine as claimed in claim 15, wherein each member is provided with a first end most remote from said discharge point and a second end nearest said discharge point, said first end comprising a generally triangular end wall spanning said legs of the member and closing said first end of the member against the entry of crop materials into the member during reciprocation of the platform.

17. In a crop harvesting machine as claimed in claim 16, wherein said end wall extends normal to said legs of the member.

18. In a crop harvesting machine as claimed in claim 11, wherein said second end comprises a generally triangular end wall spanning said legs of the member and closing said second end thereof against the entry of crop materials into the member during reciprocation of the platform.

19. In a crop harvesting machine as claimed in claim 18, wherein said end wall of the second end lies in an oblique plane with respect to said legs of the member, said end wall of the second end projecting outwardly and rearwardly from the corresponding sidewall.

20. In a crop harvesting machine as claimed in claim 11, wherein each member is provided with a first end most remote from said discharge point and a second end nearest said discharge point, said first end comprising a generally triangular end wall spanning said legs of the member and closing said first end of the member against the entry of crop materials into the member during reciprocation of the platform.

21. In a crop harvesting machine as claimed in claim 20, wherein said end wall extends normal to said legs of the member.

22. In a crop harvesting machine as claimed in claim 21, wherein said second end comprises a generally triangular end wall spanning said legs of the member and closing said second end thereof against the entry of crop materials into the member during reciprocation of the platform.

23. In a crop harvesting machine as claimed in claim 22, wherein said end wall of the second end lies in an oblique plane with respect to said legs of the member, said end wall of the second end projecting outwardly and rearwardly from the corresponding sidewall.

24. An attachment for the foraminous, reciprocable grain cleaning platform of a crop harvesting machine for increasing the cleaning efficiency of the platform during operation of the machine on side hill slopes, said platform having a pair of upstanding sidewalls extending along opposite side margins of the platform in the direction of reciprocation thereof, said attachment comprising:
 a pair of separate, elongated deflector members each having a longitudinally extending base adapted for disposition alongside of one of said sidewalls inboard of the latter when the attachment is secured to the platform,
 each of said members further having an inclined baffle surface extending along the length thereof and projecting from said base at an oblique angle relative to the plane of the latter; and
 means for securing said members to opposite sidewalls of the platform in such a manner that said baffle surfaces of the members project angularly inwardly and upwardly toward one another above lateral side margins of the platform in order to redirect air and crop materials back toward the central portion of the platform when the machine is harvesting on a side hill slope,
 said securing means serving to fix said baffle surfaces relative to said platform.

25. An attachment as claimed in claim 24, wherein each of said members further includes a plurality of spaced, transverse feeder plates projecting from said base at such an oblique angle relative to the plane of the latter as to intersect the plane of said baffle surface, said feeder plates being arranged in series extending longitudinally of the members for disposition generally above the corresponding baffle surfaces of the members and for projection generally downwardly and inwardly toward the central portion of the platform when the members are attached to the sidewalls.

26. An attachment as claimed in claim 25, wherein each of said feeder plates is inclined obliquely with respect to the longitudinal axis of the corresponding member to present a normally lower extremity closer to one end of the member than to the other end thereof and a normally upper extremity closer to said other end of the member than to said one end thereof.

27. An attachment as claimed in claim 26, wherein the feeder plates in each series thereof are parallel to one another.

28. An attachment as claimed in claim 24, wherein each of said members is generally L-shaped in transverse, cross-sectional configuration, having a pair of legs converging to a common apex extending parallel to the longitudinal axis of the member, one of said legs presenting said baffle surface and the other of said legs presenting an oppositely facing surface having a plurality of spaced, transverse feeder plates thereon arranged in a series that extends parallel to the longitudinial axis of the member.

29. An attachment as claimed in claim 28, wherein said feeder plates of each member extend parallel to one another and are inclined obliquely with respect to the longitudinal axis of the corresponding member to present a normally lower extremity closer to one end of the member than to the other end thereof and a normally upper extremity closer to said other end of the member than to said one end thereof.

30. An attachment as claimed in claim 28, wherein said one end of each member comprises a generally triangular end wall spanning said legs of the member and closing said one end of the member against the entry of crop materials into the member when the latter is attached to the corresponding sidewall of the platform.

31. An attachment as claimed in claim 30, wherein said end wall extends normal to said legs of the member.

32. An attachment as claimed in claim 30, wherein said other end of each member comprises a generally triangular end wall spanning said legs of the member and closing said other end thereof against entry of crop materials into the member when the latter is attached to the corresponding sidewall of the platform.

33. An attachment as claimed in claim 32, wherein said end wall of said other end of each member lies in an oblique plane with respect to said legs of the member extending generally outwardly from the base of the member and toward said one end thereof.

34. An attachment as claimed in claim 28, wherein said securing means for each member includes a longitudinally extending flange along the base of the member adjacent to and intersecting said one leg thereof at an obtuse angle for disposition flatly against the corresponding sidewall of the platform when the member is attached thereto.

35. An attachment as claimed in claim 34, wherein said securing means for each member further includes a longitudinally extending lip on the other leg of the member extending along said base and projecting from said other leg as an extension thereof for disposition flatly against an outturned portion of the corresponding sidewall of the platform when the member is attached thereto.

36. In a crop harvesting machine as claimed in claim 1, there being means operatively coupled with said baffle surface-defining means for longitudinal reciprocation thereof.

37. In a crop harvesting machine having apparatus for separating chaff and grain from harvested crop materials, the improvement comprising:
  a foraminous, crop material receiving and separating platform through which heavier grain particles may gravitate while lighter chaff particles may remain behind, said platform presenting a pair of side margins and a central region therebetween,
  means for directing a stream of air upwardly through the platform and across a top surface thereof for entraining separated chaff particles and carrying the same away from the platform to a point of discharge,
  said platform being reciprocable within its plane generally toward and away from said discharge point to facilitate separation of the chaff and grain particles;
  a pair of upstanding sidewalls respectively extending along said side margins and projecting upwardly from the top surface of said platform; and
  structure for preventing a disproportionate, gravitational accumulation of crop materials along a downhill one of said sidewalls when the harvesting machine is tilted during slope harvesting, whereby to reduce the amount of grain particles otherwise unintentionally discharged with the chaff particles at said point of discharge due to ineffective separation caused by such disproportionate accumulation of crop materials, said structure including:
    means defining a pair of elongated, rigid, inwardly projecting elements respectively coupled with said sidewalls and extending along a substantial portion of said platform,
    said elements being reciprocal generally along a substantial portion of said platform,
    said elements being reciprocal generally toward and away from said discharge point; and
    means mounting said elements in a fixed orientation relative to said platform.

38. In a crop harvesting machine as claimed in claim 37, said sidewalls being secured to said platform whereby said platform, sidewalls and elements reciprocate in unison.

39. In a crop harvesting machine as claimed in claim 37, each of said elements having structure defining an inclined baffle surface extending along the length of said platform and also extending upwardly and inwardly from the adjacent side margin toward said central region.

* * * * *